UNITED STATES PATENT OFFICE.

JOSEPH A. SHINN, OF PITTSBURG, PENNSYLVANIA.

SLAG CEMENT AND METHOD OF MAKING THE SAME.

No. 816,389.　　　Specification of Letters Patent.　　Patented March 27, 1906.

Application filed July 8, 1901. Serial No. 67,544.

*To all whom it may concern:*

Be it known that I, JOSEPH A. SHINN, of Pittsburg, in the county of Allegheny and State of Pennsylvania, have invented a new and useful Slag Cement and Method of Making the Same, of which the following is a full, clear, and exact description.

My invention relates to that class of cements wherein ground slag is intimately mixed with lime; and its object is to provide a dry cement composition which may be shipped in bulk to the point of use and there mixed with sand and water to give a mortar and to improve the appearance, strength, and specific gravity of previous compositions of this general character.

In carrying out my invention I use as a base a strongly-basic slag—that is, one having a preponderance of alumina or lime, or both. I granulate this slag in the well-known manner by means of a stream of water, and I then add to this granular basic slag lime in the form of calcium hydrate and also dehydrated oxid of iron. The oxid of iron may be in the form of flue-dust, which is composed of finely-divided iron ore, or in the form of mill-scale or roasted iron ore. The proportions which I prefer to employ are seventy-five to ninety parts of the granulated slag, ten to twenty parts of lime, and three to fifteen parts of iron oxid, these parts being by weight. These proportions may of course be varied, according to the character of the slag and the results desired. This composition having been made up is ground in a tube-mill or similar apparatus to such a finely-pulverized condition that over ninety per cent. of it will pass through a two-hundred-mesh screen. This product is then made up in packages of the desired size and forms the cement base which is shipped to the users.

In using this cement composition it is mixed with from two to six parts of sand with water, this wet mortar then being used in the usual way.

I prefer to use iron oxid in the form of mill-scale because of the improved color which is imparted to the cement and mortar, it being of a grayish color, closely approximating the color of Portland cement and graystone. The flue-dust or iron ore gives a reddish color, which is not considered as desirable in cements as the grayish color for some classes of work.

The advantages of my invention result from the use of the iron oxid in the finely-pulverized dry mixture, since this greatly improves the strength, specific gravity, and hardness of the mortar made up from the cement. Actual tests of this material have proved its superiority over the usual forms of slag cements containing only pulverized slag and lime as the cementitious base.

Variations may be made in the proportions above named and in the particular slag and form of iron oxid used without departing from my invention.

I claim—

1. The method of making slag-cement consisting in granulating basic slag, mixing this granulated slag with hydrated lime and dehydrated iron oxid and dry-grinding the mixture sufficiently fine that at least ninety per cent. will pass through a two-hundred-mesh screen; substantially as described.

2. The method of making slag-cement, consisting in mixing granulated basic slag, hydrated lime, and dehydrated iron oxid in the following proportions: seventy-five to ninety parts of slag, ten to twenty parts of lime, and three to fifteen parts of iron oxid, and then dry-grinding the mixture; substantially as described.

3. As a new composition of matter, a slag-cement consisting of a finely-ground mixture containing seventy-five to ninety parts of basic slag, ten to twenty parts of hydrated lime, and three to fifteen parts of iron oxid; substantially as described.

In testimony whereof I have hereunto set my hand.

JOSEPH A. SHINN.

Witnesses:
　GEO. B. BLEMING,
　C. P. BYRNES.